T. J. BRANDT.
ICE CREAM CONE DISHER.
APPLICATION FILED JULY 10, 1912.
1,069,226.
Patented Aug. 5, 1913.
2 SHEETS—SHEET 1.
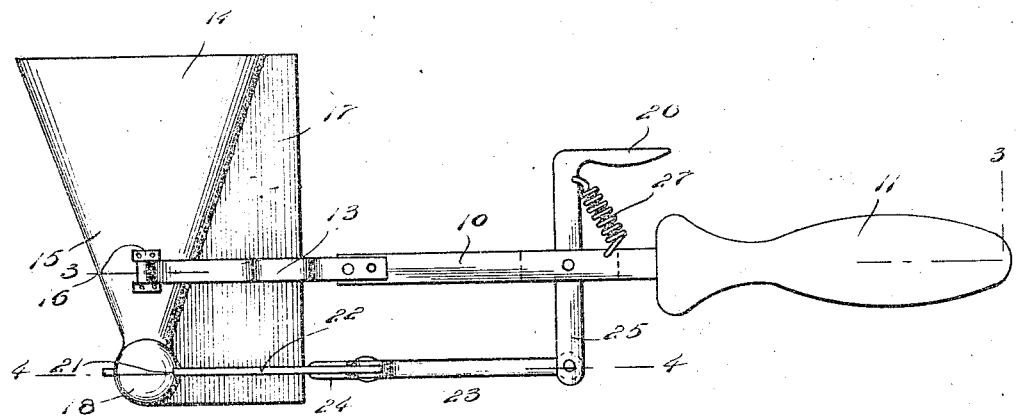
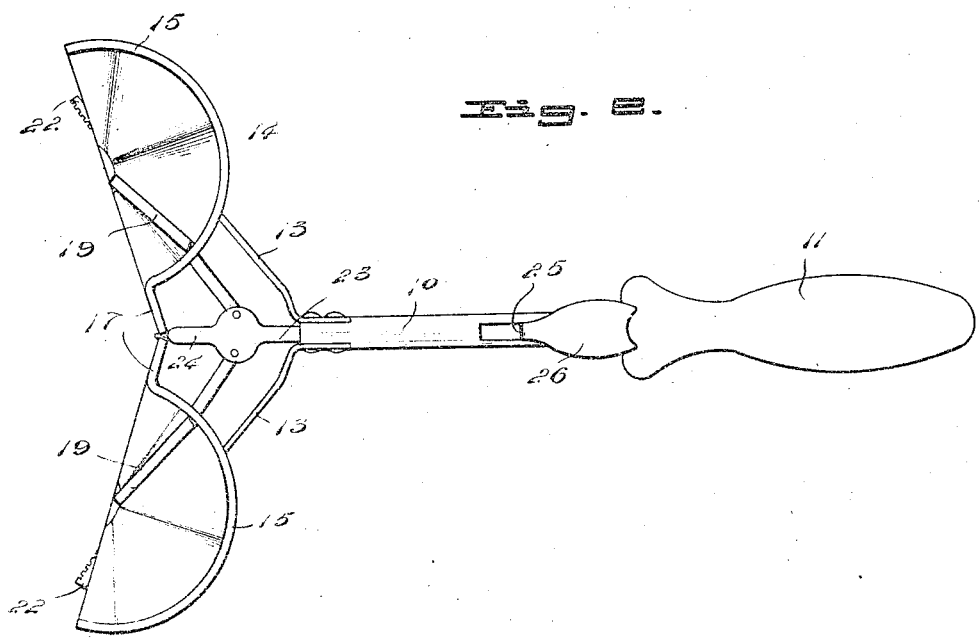
Inventor
Theodore J. Brandt
Witnesses
By Victor J. Evans
Attorney T. J. BRANDT.
ICE CREAM CONE DISHER.
APPLICATION FILED JULY 10, 1912.
1,069,226.
Patented Aug. 5, 1913.
2 SHEETS—SHEET 2.
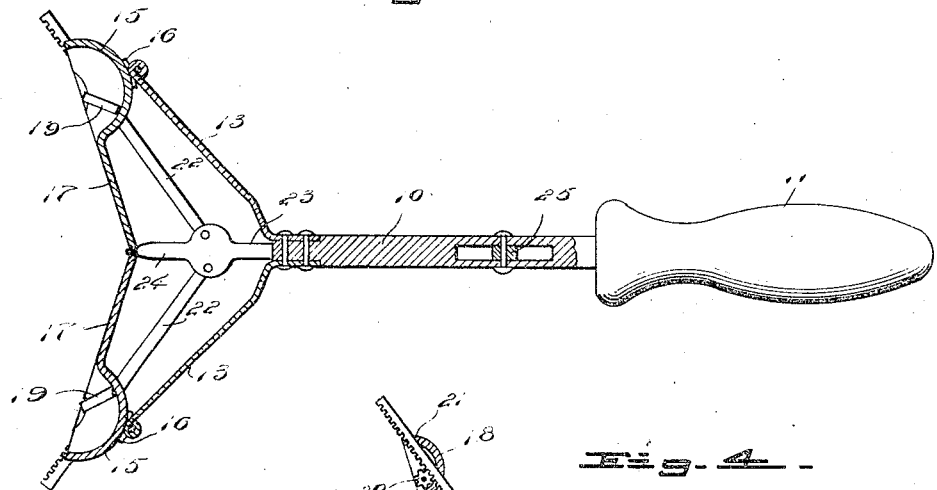
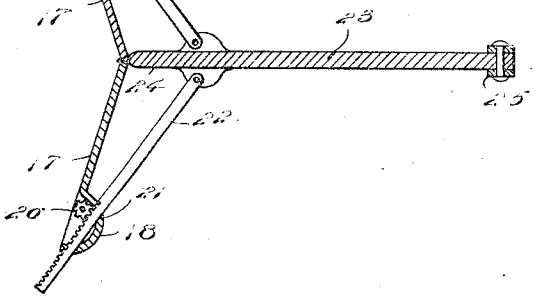
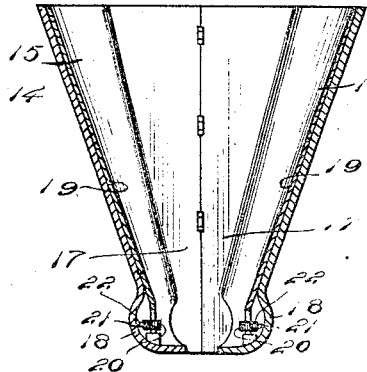
Witnesses
Inventor
Theodore J. Brandt.
By Victor J. Evans
Attorney

UNITED STATES PATENT OFFICE.

THEODORE J. BRANDT, OF GRESHAM, OREGON.

ICE-CREAM-CONE DISHER.

1,069,226.    Specification of Letters Patent.    Patented Aug. 5, 1913.

Application filed July 10, 1912. Serial No. 708,616.

*To all whom it may concern:*

Be it known that I, THEODORE J. BRANDT, a citizen of the United States, residing at Gresham, in the county of Multnomah and State of Oregon, have invented new and useful Improvements in Ice-Cream-Cone Dishers, of which the following is a specification.

An object of the invention is to provide a device for filling cones of ice cream.

The invention embodies, among other features, a device for use in forming what is commercially known as an ice-cream cone and which consists of a cone of ice cream placed within a cone of batter which has been previously subjected to a baking process. For this reason the device includes a conical structure or mold formed of movable sections and into which the ice cream is pressed, after which the sections are moved apart or swung outwardly to release the cone of ice cream from the mold and permit the same to drop into the conical structure or holder, formed of baked batter.

In the further disclosure of the invention reference is to be had to the accompanying drawings, constituting a part of this specification, in which similar characters of reference denote corresponding parts in all the views, and in which:

Figure 1 is a side elevation of the device, the mold being in closed position; Fig. 2 is a plan view of the device, the mold being in open position; Fig. 3 is a horizontal sectional view taken on the line 3—3 in Fig. 1, the mold being shown in open position; Fig. 4 is a horizontal sectional view taken on the line 4—4 in Fig. 1; and Fig. 5 is a vertical transverse sectional view taken through the mold to disclose the cutters therein.

Referring more particularly to the views, use is made of a bar 10 terminating at one end in a handle 11, a plurality of spring-like members 13 having rigid connection with the bar 10 at the forward end thereof and extending forwardly for pivotal connection with a mold 14 consisting of a plurality of similar mold sections 15, the mold 14 being conical in shape with one of the members 13 having pivotal connection with each of the said mold sections, suitable straps 16 being rigidly secured to the mold sections and engaged by the forward ends of the members 13 to form the pivotal connection between the mold sections of the members 13.

Formed with each mold section 15 is a rearwardly extending plate 17, the said plates being relatively hinged at their rear edges and at a point diametrically opposite to the front and contacting edges of the mold sections. A housing 18 is provided at the apex of the mold, the said housing being preferably made in sections, one section being formed with one of the mold sections 15 and the other section being formed with the other mold section 15, a plurality of cutters 19 being journaled in the housing 18, one cutter being provided for each mold section 15 with the blades or sharpened portions of the cutters extending into the mold 14 as shown, suitable toothed wheels 20 being keyed to the cutters 19 adjacent their points of connection with the housing 18. Openings 21 are provided in the sections of the housing 18 and slidably extending therethrough are racks 22, the teeth of the said racks being in mesh with the toothed wheels 20 of the cutters 19, the said racks being arranged to extend rearwardly on both sides of the plates 17 of the mold 14, and having pivotal connection at their rear ends with an actuating bar 23 provided with an integral, forwardly extending tongue 24, the said tongue being interposed between the racks 22 as shown, the rear end of the actuating bar 23 being arranged for pivotal connection with a lever 25 mounted to swing on the bar 10, immediately in front of the handle 11, the upper end of the said lever being bent rearwardly to form a thumb piece 26 and the said lever being normally held in vertical position by an expansible spring 27 having an end thereof secured to the bar 10 and the other end thereof engaging the lever 25.

The forward end of the tongue 24 is normally spaced a distance from the rear edges of the plates 17 and in the use of the device described, the article is grasped by the handle 11 and dipped into the cream to fill the mold 14, it being readily seen that the cream forced into the mold will assume a conical shape. When the mold has been properly filled with ice cream, the holder, made of baked batter as mentioned heretofore, is placed beneath the mold and pressure is brought against the thumb piece 26, thus operating the lever 25 against the action of the spring 27. The lower end of the lever 25 will thus be thrust forwardly and will impart a forward movement to the actuating bar 23 which in turn will move the racks 22 forwardly and over the toothed wheels 20, thus operating the cutters 19 in the mold 14 to loosen the cone of cream from the inner face of the mold. At the moment the cutters have been operated, the continued forward movement of the actuating bar 23 will bring the forward end of the tongue 24 into engagement with the rear edges of the plates 17, thus bringing pressure to bear on the plates at their point of hinging and causing the mold 14 to separate, the mold section 15 constituting the mold 14 being relatively movable in an outward direction a sufficient distance to permit the cone of ice cream to drop into the baked batter holder, it being understood that the mold sections, in moving outwardly, are operated against the spring-like action of the members 13 so that when pressure is released on the lever 25, the action of the spring 27 will return the racks 22, and consequently the cutters 19, to normal position while the spring-like action of the members 13 will cause the mold sections 15 to return to normal or closed position and form the mold 14, the device being now in position to be again dipped into the cream for the purpose of forming another cone of ice cream.

It will be understood that I do not limit myself to the construction as disclosed herein and shown in the drawings and that various changes may be made without departing from the spirit of the invention, the scope of the invention being defined in the appended claims.

Having thus described my invention, I claim:

1. In an ice cream cone disher, the combination with a handled bar, of spring-like members extended from the forward end of the bar, a mold comprising separable mold sections having pivotal connection with the said members, plates formed with the mold sections and hinged at their rear edges, cutters journaled on the said mold sections, a spring-engaged lever mounted to swing on the said bar, an actuating bar having connection with the said lever and terminating at the forward end in a tongue movable with the actuating bar to engage the rear edges of the said plates, and racks extending forwardly from the said actuating bar and having connection with the said cutters.

2. In an ice cream cone disher, the combination with a handled bar, of spring-like members extended from the forward end of the bar, a mold comprising separable mold sections having pivotal connection with the said members, plates formed with the mold sections and hinged at their rear edges, cutters journaled on the said mold sections, a spring-engaged lever mounted to swing on the said bar, an actuating bar having connection with the said lever and terminating at the forward end in a tongue movable with the actuating bar to engage the rear edges of the said plates, racks having connection with the said actuating bar, and toothed wheels keyed to the said cutters and in mesh with the teeth of the said racks.

3. In an ice cream cone disher, the combination with a handled bar, of spring-like members extended from the forward end of the bar, a mold comprising separable mold sections having pivotal connection with the said members, plates formed with the mold sections and hinged at their rear edges, cutters journaled on the said mold sections, a spring-engaged lever mounted to swing on the said bar, an actuating bar having connection with the said lever and terminating at the forward end in a tongue movable with the actuating bar to engage the rear edges of the said plates, racks having connection with the said actuating bar, toothed wheels keyed to the said cutters and in mesh with the teeth of the said racks, and a housing for the said toothed wheels, the said housing consisting of two parts formed with the said mold sections and having the said racks slidable therein.

4. In an ice cream cone disher, the combination with a handled bar, of spring-like members extending forwardly from the bar, similar mold sections having pivotal connection with the said members, plates formed with the mold sections and hinged at their rear edges, an actuating bar movable to engage the said plates and swing the mold sections apart, a lever having pivotal connection with the said bar and the said actuating bar for moving the actuating bar forwardly to engage the said plates, cutters journaled on the said mold sections, and means movable on the said actuating bar and engaging the said cutters to operate the same.

In testimony whereof I affix my signature in presence of two witnesses.

THEODORE J. BRANDT.

Witnesses:
SILAS W. THORNTON,
MARGARET THORNTON.